Feb. 5, 1963   R. F. ARNOLDY   3,076,888
METHOD OF PRODUCING WELD COATINGS OR FUSION WELDS
Filed April 19, 1961
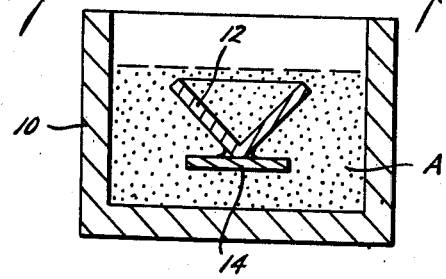
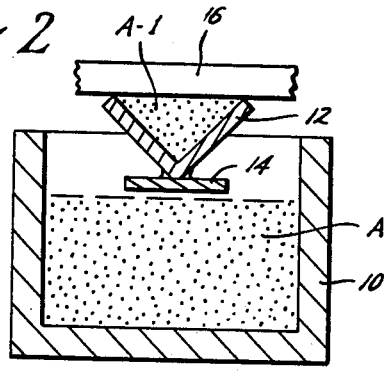
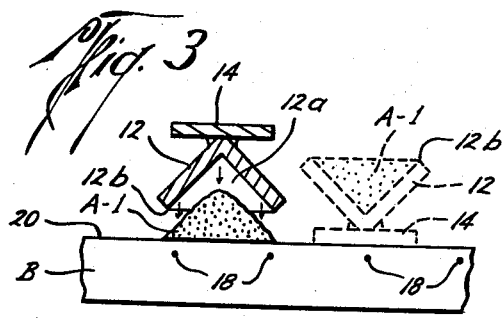
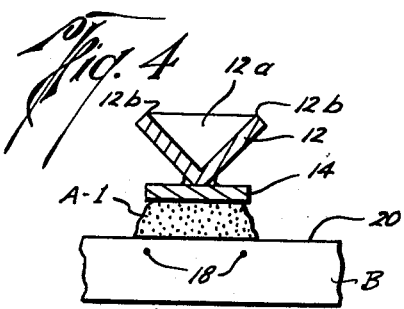
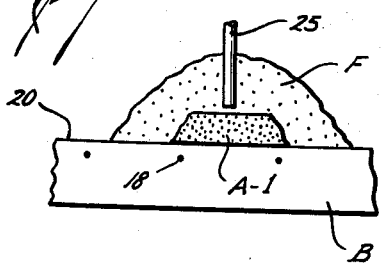
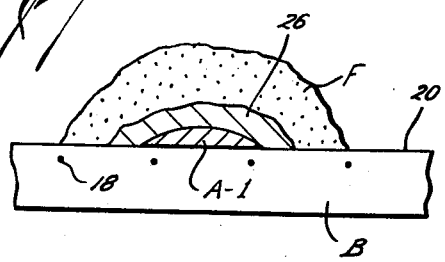
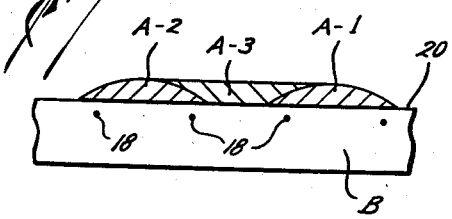
Roman F. Arnoldy
INVENTOR.
BY Hayden & Pravel
ATTORNEYS

United States Patent Office 3,076,888
Patented Feb. 5, 1963

3,076,888
METHOD OF PRODUCING WELD COATINGS
OR FUSION WELDS
Roman F. Arnoldy, Houston, Tex., assignor to R. I. Patents, Inc., Houston, Tex., a corporation of Texas
Filed Apr. 19, 1961, Ser. No. 104,185
10 Claims. (Cl. 219—73)

This invention relates to a new and improved method of producing or applying weld coatings and fusion welds, and it particularly relates to a method wherein alloy weld coatings or fusion welds having closely controlled analyses are deposited with automatic welding apparatus or semi-automatic welding apparatus having means for mechanically controlling the travel and feed of an electrode.

This application is a continuation-in-part of my U.S. patent application Serial No. 39,193, filed June 27, 1960, which was a continuation-in-part of my U.S. patent application Serial No. 5,693, filed February 1, 1960, both now abandoned.

So far as is known, the problem of depositing alloy weld coatings heretofore has been approached in one of the following four ways:

(1). The drawn wire method;
(2). The cast rod method;
(3). Alloy powder in ductile tube method; and,
(4). The submerged melt alloy in the flux method.

In the drawn wire method an alloy of approximately the coating analysis desired is drawn into wire which is then used as a manual electrode or fed as a bare wire in a submerged melt or in metal inert gas welding operations. This method is limited because many alloys cannot be drawn into wire and others can be so drawn only with great difficulty and considerable expense. Also the analysis of the deposited hardfacing is not accurately predictable or readily controlled because the arc is directly with the base metal which causes an unequal and poorly controllable dilution of the weld coating.

In the cast rod method used usually in hardfacings, the welding rods are cast in lengths up to fourteen (14) inches which seems to be a practical limit in manufacturing. Because of such short lengths, cast rods are satisfactory for manual welding only and are not long enough for practical use in automatic or semi-automatic welding equipment where the electrode rod is generally coiled in lengths of as much as a hundred foot or more. If the relatively short lengths of the cast weld rod were employed in automatic or semi-automatic welding apparatus, the time required for inserting each new rod would be so excessive compared to normal operations that one of the main purposes of the automatic or semi-automatic welding equipment would be defeated.

Furthermore, the external surface of the cast rod is so rough that it is practically impossible to feed such rods through the automatic or semi-automatic welding equipment. Even when cast rods are used in manual welding, the analysis of the deposited hardfacing is not predictable or readily controlled because the arc is directly with the base metal which causes an unequal and uncontrollable dilution of the deposited hardfacing.

With respect to the ductile tube method, the welding arc, like in the alloy wire method, is directly with the base metal so that the analysis of the deposited hardfacing is not closely controllable and variable because of dilution of the weld, with variations for the individual constituents in selected areas varying up to 50% from the desired amount, and with variations of as much as 25% from the desired amount being common. Furthermore, the efforts to control the variations in the past have resulted in very low deposition rates for the weld. Additionally, with the ductile tube method, the alloy forming elements are carried in a tube of ductile metal which is the matrix metal. To obtain the best results with automatic or semi-automatic open arc welding, the diameter of the ductile tube should be about 7/64 of an inch. If the analysis of the material to be deposited has about 60% or less of the ductile or matrix metal, the required wall thickness of the ductile tube becomes too thin to allow handling of the tube through the welding equipment without collapsing. Therefore, the ductile tube method is necessarily limited to analyses wherein the alloy forming elements or hardness producing elements are relatively low in amounts.

In the submerged melt alloy in the flux method, the alloy materials or hardness forming elements are mixed with the flux. A ductile metal electrode from a coil is positioned in such mixture and an electric arc is created through the mixture for melting the flux and the alloy materials. With such method, the amount of the alloy or hardness forming elements must necessarily be relatively low because the welding operation depends upon a high electrical resistance in the molten flux and alloy; if the alloy or hardness forming elements are present in too great an amount the molten flux and alloy will provide a low resistance conductor which is unsatisfactory for welding.

Another major disadvantage of the submerged melt alloy in the flux method is the inability to control the analysis of the deposited weld metal. This inability is due to the fact that the melting of the flux and alloy mixture and therefore the amount of the alloy deposited on the base metal is a function of the length of the electric arc through the mixture and therefore the voltage applied across the electrode as well as the current passing through it. Changes in either the voltage or the current affect the amount of the electrode and the alloy elements melted, but not in a proportional manner, and those factors have been found to be difficult, if not impossible, to control closely enough to accurately deposit the alloy within commercial tolerance limits.

Also, in the previous electric arc welding methods, the electric arc is between the electrode and the material to which the weld metal is welded so that only about one-third or less of the heat of the arc has been used for melting the weld metal or facing. This unused heat produces the undesirable effects of base metal melting, with dilution and structural weakening, distortion of the work, and detrimental heat treatment of the base metal.

It is therefore an object of this invention to provide a new and improved method of producing or applying alloy coatings or fusion welds of joints which overcomes the aforesaid disadvantages of the prior art.

A principal object of this invention is to provide a new and improved process for producing and applying weld coatings or fusion welds of closely controlled deposit analyses by predepositing an accurately weighed quantity of granular alloy material, melting with an arc from a wire electrode, and controlling the metal introduced as melted electrode by fixing at a constant value the rate of electrode travel over the alloy pile and the rate of feed of the electrode.

Another principal object of this invention is to provide a new and improved process for producing and applying weld coatings or fusion welds which have closely controlled deposit analyses, melt substantially no base metal, and greatly decrease heat input and distortion of the work, by passing an arc to the top of a pile of granular alloy and not to the base metal, wherein a portion of the alloy pile is melted along with the electrode to form a super-heated puddle which in turns melts the balance of the pile and a thin skin of base metal to form a bond with it.

An important object of this invention is to provide a new and improved process for producing alloy coatings or fusion welds of joints having a closely controlled analysis and which is capable of producing an alloy coating having higher percentages of alloy elements or hardness forming elements than can be produced by the known prior art methods using automatic or semi-automatic welding equipment.

A further object of this invention is to provide a new and improved method of producing or applying weld coatings or fusion welds wherein the rate of weld deposition is increased as compared to prior known methods by forming the welding arc between the electrode and the top of a pile of electrically conductive granular or powder constituents which are melted to form the final weld together with the metal of the electrode.

Still another object of this invention is to provide a new and improved method of producing or applying weld coatings or fusion welds wherein the rate of weld deposition is increased as compared to prior known methods by increasing the bulk or ratio of powder or granular welding constituents to the metal melted from the welding electrode as compared to the ratios of powder to electrode which have heretofore been used for ordinary welding or for forming alloy welds.

A still further object of this invention is to provide a new and improved method of producing or applying new weld coatings or fusion welds wherein the rate of weld deposition is increased as compared to prior known methods by providing in powder or granular form some of the metal forming the final weld which would normally be provided from the electrode to thereby fully use the heat of the arc to melt material for deposit without changing the desired composition of the final weld.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIGS. 1–7 of the drawings are schematic views illustrating the method of this invention with the FIGS. 1–7 in the sequence in which the method of this invention is preferably performed.

Briefly, the method of this invention involves the application of an alloy coating on a base metal or a fusion weld at a joint wherein the analysis of the weld is closely controlled using automatic or semi-automatic welding equipment and wherein the analysis of the weld can be accurately controlled to close tolerances using mechanized welding equipment and where the rate of deposition is greatly increased and the heat input to the base metal greatly decreased while making possible the deposition of alloys too high in alloy content for tube wire or of unsuitable composition to be drawn into solid wire as compared to the prior art methods. The close control of the alloy constituents of the weld and also the obtaining of the relatively high alloy content in such welds are features which are particularly desirable in oil refinery units which are provided with a hardfacing to resist catalyst abrasion. With this method of this invention, the hardfacing can be deposited on the refinery units or similar surfaces with a carbon content in the hardfacing at 3.5% or higher and with a chromium or other carbide forming element content at 21% or higher. Such relatively high alloy content in the hardfacing can be maintained uniformly throughout the hardfacing with the method of this invention which will be explained in detail hereinafter. So far as is known, none of the prior art methods have been able to provide such welds with any reliable uniformity of analysis. Further, the rate of the deposition of the welds is increased, the cost of producing the welds is decreased and the dilution and penetration into the base metal is decreased as compared to prior known methods.

The preferred embodiment or form of the invention is illustrated in FIGS. 1–7 of the drawings which illustrate the sequence of steps which are carried out in performing the preferred embodiment or form of the invention. Thus, as seen in FIG. 1, a container or box 10 is provided for holding the powdered or granular weld elements A which are to be used in forming the desired alloy for the alloy weld. The particular constituents of the powdered or granular weld elements A will be discussed more in detail hereinafter in connection with a specific example of the invention.

A tray 12 which may be of any suitable or desired configuration but which is preferably in the shape of a right angle as shown, is provided for removing a desired amount of the powdered or granular weld elements A from the container or box 10. The tray or holder 12 has a predetermined or known volume and width, the purpose of which will be hereinafter explained. Also, the tray or holder 12 preferably has a flat metal strip or bar 14 welded or otherwise secured to the apex of the tray or holder 12 for a purpose to be hereinafter explained.

In carrying out the method of this invention a quantity of the powdered or granular weld elements A is picked up with the tray or holder 12 and then a flat bar 16 or any similar member is used for scraping off any excess above the top edges of the tray or holder 12 so that a predetermined quantity A–1 of the powder or elements A is confined within the tray or holder 12. At this point, it should be noted that the ends of the tray or holder are closed, one end of which is visible in FIGS. 3 and 4 of the drawings and is designated with the numeral 12a. A similar closure or end is provided at each end of the tray 12, although one of such end closures 12a may be slidable to adjust the length of the tray or holder 12 which is in use, depending upon the length of the weld to be formed or deposited.

In FIG. 3 of the drawings, the depositing of the quantity A–1 of the powdered or granular weld elements is illustrated, with the dotted line position of the tray or holder 12 being indicated as the first position and the solid line position being indicated as the second or dumping position. Prior to the dumping of the quantity of powdered or granular weld elements A–1, the base or base metal B which is formed of a metal such as steel or any other material to which a welded alloy coating may be applied, is provided with punch marks 18 which are at regularly spaced distances from each other to designate predetermined widths on the external surface 20 of the base metal B. Such punch marks 18 may be placed on any part of the external surface 20 of the base B so long as they are readily available for use in determining the desired widths of the areas to be coated, as will be more evident hereinafter. Also, it will be evident that other types of markings besides the punch marks 18 may be employed so long as the surface to be coated on the base B is divided into the predetermined widths or strips.

For ease in the positioning of the quantity of the powdered or granular alloy constituents A–1 on the predetermined width between the punch marks 18 or other similar marking, the tray or holder 12 is initially placed with the plate or bar 14 resting upon the upper surface 20 of the base B in the dotted line position shown in FIG. 3. The tray or holder 12 is then manually flipped or turned over rapidly to invert the tray 12 with its edges 12b in contact with the upper surface 20 of the base B and with such longitudinal edges 12b substantially in alignment with the punch marks 18 or other indication of the particular strip or width of the base B to be coated.

The tray or holder 12 is then removed to leave the alloy constituents A–1 in a pile with the edges thereof terminating coincidental with the longitudinal edges of the predetermined strip upon which the material A-1 was placed. When the tray 12 is constructed with the plate or bar 14 welded thereto as shown in the drawings, the tray 12 is next inverted again to position the plate or bar 14 below the tray 12 in the position shown in FIG. 4 to flatten and compress the powdered or granular alloy constituents A-1 without materially moving the material A-1 outwardly beyond the punch marks 18 for the particular strip upon which the deposit of the alloy A-1 has been made.

Thereafter, a covering of powdered or granular flux or welding composition F is preferably placed over the strip of the alloy constituents A-1 but the process may be used without employing a flux, as will be more fully explained. When using a flux in the process, the particular amount of the flux or welding composition F does not need to be accurately controlled but the covering thereof over the alloy constituents A-1 should be at least about one-half (½") deep over the alloy constituents A-1 as shown in FIG. 5 so as to maintain a flux covering over the welding action. The flux composition F may be any of the types of flux or welding composition which are commonly available for use in the submerged type of alloy in the flux method. By way of example, the flux or welding composition would have as its principal ingredients: silica, at least one basic constituent consisting of an alkaline earth such as lime or magnesia or a mixture thereof, and alumina.

After the covering of the flux or welding composition F is placed over the quantity of the alloy constituents A-1, an electric arc welding electrode 25, which is a ductile metal forming one of the major constituents of the desired alloy such as iron, cobalt, aluminum, copper, nickel, silver, titanium, or a mixture of several of such metals, or a mixture of one or more of such metals with carbon or other constituents, is submerged in the flux or welding composition F to a point just above the upper surface of the welding composition A-1 to create an electric arc between the lower end of the electrode 25 and the upper surface of the strip or pile of the alloy composition A-1. The electrode 25 is fed substantially parallel to the surface 20 of the base metal B. The electrode 25 is fed from and is supported by automatic or semi-automatic welding equipment of any known type so long as the travel and the feed of the electrode 25 is held substantially constant at a predetermined rate so that a predetermined quantity of the metal of the electrode 25 is deposited with the melting of the composition A-1. The feeding of the electrode 25 may be visually indicated by using a known type of tachometer on the motor or the feed rollers which feed the electrode from an automatic or semi-automatic welding machine. If for some reason the rate of feed of the electrode starts to change, such rate is immediately adjusted by adjusting the current on the electrode to maintain the feeding rate of the electrode substantially constant. The tachometer need not be used on automatic welding machines in which the current on the electrode is automatically varied during the welding to maintain a constant electrode feed rate. It should be particularly noted that due to the fact that the electrode arc is between the top of the pile of alloy and the lower end of the electrode while feeding the electrode at a substantially constant rate, only the upper portion of the alloy pile is actually melted along with the electrode so that a super-heated puddle is formed which in turn melts the balance of the pile therebelow and also a very thin skin of the base metal to form a bond with it. In that way, substantially no dilution of the weld occurs due to the melting of the base metal and an accurate analysis of the applied weld is thus maintained. Further, substantially all of the available heat of the arc is used in the melting of the alloy components and the electrode.

In FIG. 6, the composition A-1 is shown in the molten state which contains a portion of the melted electrode 25 deposited therewith. The alloy composition thus formed is of the desired constituency or composition because of the added electrode metal which raises the percentage of this metal to the desired amount to obtain the desired alloy percentages. It should be noted that the bead shown in FIG. 6 formed by the melted or molten composition A-1 with the molten electrode therewith is a free weld bead which is somewhat higher in the central portion than at the edges and which extends beyond the punch marks 18 a small distance which is compensated for during the subsequent welding operations, as will be explained. It should also be pointed out that the molten flux or fused flux 26 forms a layer over the molten alloy A-1 and such molten flux 26 is removed upon cooling to leave only the welded facing with the composition A-1.

In FIG. 7, the first alloy strip which was applied is designated with the designation A-1. The second alloy strip A-2 is deposited in the identical manner to the alloy strip A-1 and it is to be noted that the alloy strip A-2 is placed on the alternate strip or width of the base B to leave an intermediate space of approximately the width of each of the strips A-1 and A-2. Each of the strips A-1 and A-2 are formed as free weld beads. Thereafter, the intermediate space between the welds A-1 and A-2 is filled with a filler bead A-3 which is deposited in the same manner as previously explained in connection with the strip or weld A-1 except that the bead or weld A-3 is confined by the adjacent beads or welds A-1 and A-2 which have been previously deposited. Thus, by continuing such process across a particular area or surface of the base B or other metal, a hardface or other alloy coating is welded to the base B which has a substantially uniform thickness and is substantially homogenous throughout. It should be pointed out that the filler bead A-3 extends beyond its punch marks 18 to overlap with the ends of the adjacent sides of the strips A-1 and A-2 to about the same extent that the ends of the strips A-1 and A-2 extend inwardly to the intermediate space therebetween so that upon a fusion of the strips A-1, A-2 and A-3, the same amount of the alloy coating is present on the entire upper surface 20 of the base B.

In actual practice, alternate strips such as the strips A-1 and A-2 would be applied throughout a relatively large area and thereafter the filler strips such as the strip A-3 would be applied in between the alternate strips to completely cover the area or surface with the hardface coating. However, the strips may be initially applied without any space between them so that the second strip A-3 is applied immediately after the first strip A-1, and then the adjacent strip A-2 and others are applied in sequence. In each instance, except for the type of the bead which is formed, the method employed for depositing or forming such bead on the base B would be identical.

In the one form of the invention, the punch marks 18 on the base B are ⅝ of an inch apart so that each of the strips on the surface 20 of the base B are of the ⅝ inch width. The tray or holder 12 is preferably made ⅞ of an inch wide from the top inner edge 12b to the opposite top inner edge 12b of the holder 12. The tray 12 would also preferably be 15 inches in length from the inside surfaces of the end closures 12a, and with the sides of the tray 12 at approximately a 90 degree angle, the depth of the tray from the apex to the top would be 7/16 of an inch.

Assuming that it is desired to produce an alloy coating of the hardface type which will have a final alloy analysis for the alloy weld coating as follows: iron—53.25%; chromium—31.25%; carbon—6.75%; manganese—5.25%; and silicon—3.5%, the composition of the alloy powder A is first calculated and then the proper percentages are placed in the container 10. In this form of the invention, the particular components of the alloy composition A which are placed in the container 10 would be added in the cheapest and best available commercial form. Therefore, the metals such as chromium would normally be added as ferro-chromium and/or other ferro alloys which would normally introduce an amount of the iron along with the alloy constituents so that iron in the powder would constitute about 19% of the total amount of the iron in the final analysis. Therefore, based upon 15 inch strips, or in other words, the length of the tray 12 of 15 inches, the composition A would include the following quantities of the aforesaid components for each 15 inch strip: iron—1.09 ounces; chromium—1.78 ounces; carbon—0.38 ounce; manganese—0.3 ounce; and silicon—0.2 ounce to make a total of 3.75 ounces for each 15 inch strip. The total weight of the alloy composition A thus placed into the container 10 will depend upon the number of the weld strips to be applied to the base B. Actually, therefore, each filling of the tray 12 will remove the foregoing weights or percentages of the various components mentioned in the alloy composition A. They will of course be in the powdered or granular form and will not be fused when in the container 10.

The additional iron is added to the alloy coating to make up the full 53.25% in the final alloy composition by the melting of the electrode 25 (FIG. 5). Therefore, for each 15 inch strip, 1.59 ounces of the electrode 25 is melted. The rate of the rod melt in the deposition is determined by controlling the rate of feed of the electrode, the electrical current passing through the rod 25, the amount of the rod extension which is the height of the nozzle above the work, and also the rate of the travel of the electrode during the welding operation. In the foregoing form of the invention, by way of example, the current which would be used would be 280 amperes, the rod extension above the work would be 1¼ inches and the rate of travel of the electrode would be 15 inches per minute.

By way of further example, to produce an alloy weld coating of a non-hardface type, an alloy having the following analysis may be provided: chromium—13%; manganese—1%; silicon—0.85% carbon—0.15%; and iron—85%. The method steps previously described in connection with FIGS. 1-7 would be employed except that the alloy powder A would consist of the following amounts of the alloy constituents for each fifteen (15) inch strip of weld coating to be applied to the base B: chromium—.74 oz.; manganese—.057 oz.; silicon—.048 oz.; carbon—.002 oz.; iron—.400 oz. Also, the electrode 25 would be a ductile steel electrode which would be melted at a controlled rate to deposit the following components uniformly on each fifteen (15) inch strip: iron—4.445 oz. and carbon—.006 oz.

It will be appreciated that the foregoing specific percentages of the alloy composition and also the specific dimensions and the factors governing the rate of the rod or electrode melt may be varied, and the foregoing examples are therefore given by way of illustration only and not by way of limitation. Since many alloys contain chromium, it is generally one of the alloying elements employed in the alloy composition A, although other elements are usually present. Some of these are nickel, copper, molybdenum, vanadium, silicon, manganese, carbon, cobalt, tungsten and boron.

Although the invention has been described above with repect to the process using a flux covering F, it should be understood that the invention may also be performed with an open electric arc or with a gas shielded arc, neither of which requires a flux. The gas used for the gas shielding may be any of the gases now employed for such purpose, such as argon and carbon dioxide. In any event, the electrode 25 is positioned just above, but spaced from, the upper surface of the alloy constituents A-1 as shown in FIG. 5 whether a flux is used or not so that the electric arc is between the electrode and the alloy constituents. All available heat of the arc is thus used for melting the weld components and the electrode so that the rate of deposition of the weld is increased as compared to the usual methods of depositing a weld in which the arc is between the electrode and the object being coated. Also, since only the weld facing and the electrode are melted by the arc, there is substantially no dilution of the base metal B.

The rate of weld deposition may be further increased with the method of this invention by increasing the ratio of the amount of the powder or granular constituents to the amount of the metal deposited from the electrode. Such increase in the bulk of the powder or granular material is obtained by providing a portion of the amount of the metal of the electrode in granular or powder form rather than providing all or substantially all of such metal constituent from the electrode. For example, if the final deposited coating is to have a certain percentage of iron, normally it would be thought that it would be desirable to deposit all or substantially all of the iron from an iron welding rod or electrode except for whatever iron might be present in the granular material for reasons of economy or convenience, but it has been found that such is not the case. Quite the contrary, by providing a substantial portion of the iron in powder or granular form so as to increase the bulk of the powder or granular constituents as compared to the amount of metal deposited from the welding rod or electrode, it has been discovered that the rate of weld deposition is materially increased. Further, the cost of producing the weld is generally reduced since the powder or granular form of the metal is normally less expensive than the electrode. This method is not limited to the example of the iron electrode and powder explained above but is applicable for electrodes and powder of other metals so long as a substantial quantity of the metal of the electrode is provided in the final weld by using a powder or granular form of the same metal as the electrode so as to provide a substantial bulk of the powder or granular material as compared to the amount of the metal electrode deposited. Ordinarily, it is preferred to maintain a ratio of about twice as much powder or granular material as the amount of the deposited metal of the electrode, although the invention is not limited thereto, as will be evident from the following specific examples.

If it is desired to provide a final weld composition having 25% chromium, 20% nickel, and 55% iron, the rate of deposition of the weld, using the method of this invention and with 400 amperes current on the electrode, is 26.5 pounds/hour if all of the iron is applied from the electrode. The ratio of the granular material to the electrode metal in such example is 0.82/1. However, if the ratio of granular material to the electrode metal is increased to 2/1 by adding 22% of the total deposited weight as granular or powdered iron, then the rate of deposition is increased to about 46 pounds/hour. If the ratio of granular material is increased to 1/1, the rate of deposition is about 29 pounds/hour. If the ratio of granular material is increased to 1.5/1, the rate of deposition is about 38 pounds/hour. The increased rate has been found to be approximately a straight line function when plotted on a graph so the increase obtained for other ratios will be in accordance with the foregoing examples.

By way of further example, if a deposited weld having 18% chromium, 8% nickel and 74% iron is desired, the ratio of granular material to deposited electrode is 0.35/1 and the rate of deposition is about 20 pounds/hour, with all of the iron deposited from the electrode. By providing iron in granular or powdered form in an amount of 41% of the total weight of the deposited weld, the ratio of granular material to electrode is 2/1 and the deposition rate is about 46 pounds/hour. The deposition rates for other ratios are the same as given in the previous example.

For a 1% chromium steel, the ratio of granular material to deposited electrode metal is 0.01/1 and the deposition rate is about 15.5 pounds/hour, with all of the iron added from the electrode. When 66% of the total deposited weld is added as granular iron, the ratio of granular material to the deposited electrode is increased to 2/1 and the deposition rate is about 46 pounds/hour. The deposition rates for the other ratios are the same as given in the first example above.

As pointed out above, the invention is not limited to the use of iron electrodes, and by way of example, for depositing a pure nickel coating, if all of the nickel is applied from the electrode, the rate of deposition is about 15 pounds/hour, but if the ratio of granular material to the deposited electrode is increased to 2/1 by providing 67% of the final weld weight as granular material and 33% from the electrode, the rate of deposition is then about 46 pounds/hour. Likewise, the deposition rates for other ratios are the same as given in the first example above.

From the foregoing examples, it will be appreciated that the rate of depositing a desired weld composition in a weld area is varied by varying the ratio of the granular material to the electrode and without altering a particular desired final weld composition.

Although the invention has been specifically described for applying a weld coating on a base metal, it will be understood that the invention is obviously equally applicable to fusion welding of joints.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A method of producing a weld at a weld area, comprising the steps of, placing a predetermined quantity of alloy forming elements on a predetermined section of the weld area, then creating an electric arc with an electrode between the alloy forming elements and the electrode to melt the alloy forming elements and the electrode, and feeding the electrode at a measured rate during the melting of the electrode to thereby deposit a desired amount of the electrode in said predetermined area for obtaining the desired alloy analysis of the alloy weld on the weld area.

2. A method of producing a weld at a weld area, comprising the steps of, placing a predetermined quantity of granular electrically conductive weld elements on a predetermined section of the weld area, and then moving and melting an electric welding electrode at a predetermined rate with the arc between the electrode and the upper surface of said quantity of alloy forming elements to deposit a desired amount of the electrode on the weld area and to simultaneously fuse same with the alloy forming elements for obtaining the desired alloy analysis of the alloy coating on the weld area.

3. A method of producing a weld on a base metal, comprising the steps of, placing a pile of granular electrically conductive weld elements on a section of the base metal, and then creating an electric arc with an electrode between the electrode and the top of the pile to melt and superheat a portion of the weld elements and the electrode, whereby the superheated portion thereafter melts the balance of the weld elements and only a very thin skin of the base metal to prevent dilution of the applied weld.

4. A method of producing a weld at a weld area, comprising the steps of, placing a pile of granular electrically conductive weld elements on a section of the weld area, and then creating an electric arc with an electrode between the electrode and the top of the pile to melt the weld elements and the electrode, said granular elements including a portion thereof of the same metal as the metal of the electrode, whereby an increased rate of deposition of the weld elements and electrode is obtained as compared to the depositing of the entire quantity of the metal of the electrode from the electrode itself.

5. A method of producing a weld at a weld area, comprising the steps of, placing a pile of granular electrically conductive weld elements on a section of the weld area, and then creating an electric arc with an electrode between the electrode and the top of the pile to melt the weld elements and the electrode, the ratio of the weight of the weld elements melted into the final weld to the weight of the metal deposited from the electrode into the final weld being at least one to one, whereby an increased rate of deposition of the weld elements and electrode is obtained as compared to the depositing of the entire quantity of the metal of the electrode from the electrode itself.

6. A method of producing a weld at a weld area, comprising the steps of, placing a pile of granular electrically conductive weld elements on a section of the weld area, and then creating an electric arc with an electrode between the electrode and the top of the pile to melt the weld elements and the electrode, the ratio of the weight of the weld elements melted into the final weld to the weight of the metal deposited from the electrode into the final weld being not less than about two to one, whereby an increased rate of deposition of the weld elements and electrode is obtained as compared to the depositing of the entire quantity of the metal of the electrode from the electrode itself.

7. A method of producing an alloy weld on a base, comprising the steps of, placing a predetermined quantity of alloy forming elements on a predetermined surface area of the base, then creating an electric arc between the lower end of an electrode and the alloy forming elements to melt the alloy forming elements and the electrode, moving the electrode aprallel to the surface area on which said elements are deposited at a substantially constant rate, and feeding the electrode at a measured rate while moving the electrode relative to said elements to thereby obtain the desired amount of the electrode in the alloy weld on the base.

8. The method set forth in claim 1, wherein said alloy forming elements are carbide forming elements and wherein said electrode is a ductile metal.

9. The method set forth in claim 1, wherein said alloy forming elements are carbide forming elements and wherein said electrode includes iron.

10. A method of producing a weld on a base as a coating or fusion welding, comprising the steps of, placing a predetermined quantity of alloy forming elements on a predetermined area of the base, positioning a welding electrode above but out of contact with said alloy forming elements, and creating an electric arc between the welding electrode and the alloy forming elements for applying substantially all of the heat of the area for the melting of the electrode and the alloy forming elements so that only the upper portion of the elements is actually melted by the heat of the arc to produce a super-heated puddle which in turn melts the rest of the elements therebelow and a thin skin of the base.

References Cited in the file of this patent

UNITED STATES PATENTS

| | | |
|---|---|---|
| 2,175,607 | Kinkead | Oct. 10, 1939 |
| 2,191,469 | Hopkins | Feb. 27, 1941 |
| 2,330,289 | Keir | Sept. 28, 1943 |
| 2,927,990 | Johnson | Mar. 8, 1960 |